United States Patent
Paulraj et al.

(10) Patent No.: US 11,977,877 B2
(45) Date of Patent: May 7, 2024

(54) SYSTEMS AND METHODS FOR PERSONALITY BASED FIRMWARE UPDATES

(71) Applicant: Dell Products, L.P., Round Rock, TX (US)

(72) Inventors: Deepaganesh Paulraj, Bangalore (IN); Kala Sampathkumar, Bangalore (IN); Rama Rao Bisa, Bangalore (IN); Darshan Hebbar, Sagar (IN); Manjunath Am, Bangalore (IN); Elie Antoun Jreij, Pflugerville, TX (US); Naveen Karthick Chandrasekaran, Bangalore (IN); Pavan Kumar Gavvala, Bangalore (IN); Manjunath Vishwanath, Bangalore (IN); Sivakami Velusamy, Bengaluru (IN)

(73) Assignee: Dell Products, L.P., Round Rock, TX (US)

( * ) Notice: Subject to any disclaimer, the term of this patent is extended or adjusted under 35 U.S.C. 154(b) by 81 days.

(21) Appl. No.: 17/935,158

(22) Filed: Sep. 26, 2022

(65) Prior Publication Data
US 2024/0103830 A1    Mar. 28, 2024

(51) Int. Cl.
G06F 9/445    (2018.01)
G06F 8/65    (2018.01)

(52) U.S. Cl.
CPC .................................. *G06F 8/65* (2013.01)

(58) Field of Classification Search
CPC ..... G06F 8/70; G06F 8/71; G06F 8/76; G06F 16/00
USPC .................................................. 717/168–178
See application file for complete search history.

(56) References Cited

U.S. PATENT DOCUMENTS

| | | | | |
|---|---|---|---|---|
| 10,447,483 B1 * | 10/2019 | Su | ........................ | H04L 9/3226 |
| 2020/0134183 A1 * | 4/2020 | Rahardjo | .............. | G06F 21/572 |
| 2022/0391124 A1 * | 12/2022 | Darji | .................... | G06F 3/0679 |

* cited by examiner

*Primary Examiner* — Chuck O Kendall
(74) *Attorney, Agent, or Firm* — Fogarty LLP (57) ABSTRACT

In various embodiments, a remote access controller supporting remote management of an Information Handling System (IHS). The remote access controller receives a first firmware image comprising first firmware for a first hardware component of the IHS. A personality of the first firmware is determined and at least a portion of the first firmware is stored to a first region of a persistent storage of the first hardware component, where the first region is designated as storing firmware for adapting the first hardware component to the first personality. In response to a detected reconfiguration of the IHS, the remote access controller generates a notification of the first firmware that is stored by the first hardware component and that is usable to adapt operation of the first hardware component to the first personality.

20 Claims, 4 Drawing Sheets

SYSTEMS AND METHODS FOR PERSONALITY BASED FIRMWARE UPDATES

FIELD

The present disclosure relates generally to Information Handling Systems (IHSs), and relates more particularly to managing firmware used by IHSs.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Various hardware components of an IHS may operate using firmware instructions. From time to time, it is expected that firmware utilized by hardware components of an IHS may be updated. Such firmware updates may be made in order to modify the capabilities of a particular hardware component, such as to address security vulnerabilities or to adapt the operations of the hardware component to a specific computing task. When firmware updates are made to a hardware component of an IHS, it is preferable that the IHS experience no downtime and with minimal degradation in the performance of the IHS.

SUMMARY

In various embodiments, IHSs are provided that may include: one or more CPUs utilizing one or more buses that connect to a plurality of hardware components of the IHS; a first of the hardware components of the IHS that is adapted to a first personality through operation of a first firmware; and a remote access controller supporting remote management of the Information Handling System (IHS), the remote access controller comprising a logic unit and a memory device having instructions stored thereon that, upon execution by the logic unit, cause the remote access controller to: receive a first firmware image comprising the first firmware; determine a personality of the first firmware; store at least a portion of the first firmware to a first region of a persistent storage of the first hardware component, wherein the first region is designated as storing firmware for adapting the first hardware component to the first personality; and in response to a detected reconfiguration of the IHS, generate a notification of the first firmware that is stored by the first hardware component and usable to adapt operation of the first hardware component to the first personality.

In additional IHS embodiments, the first hardware component may be adapted to a second personality through operation of a second firmware and wherein execution of the instructions further causes the remote access controller to: receive a second firmware image comprising the second firmware; determine a personality of the second firmware; and store at least a portion of the second firmware to a second region of the persistent storage of the first hardware component, wherein the second region is designated as storing firmware for adapting the first hardware component to the second personality. In additional IHS embodiments, execution of the instructions further causes the remote access controller to: parse the first firmware image to identify a first portion of the first firmware image comprising instructions for operation of the first hardware component according to the first personality and also to identify a second portion of the first firmware image comprising firmware instructions for core operations of the first hardware component, wherein the first portion of the first firmware image is stored to the first region of the persistent storage of the first hardware component that is designated as storing firmware for adapting the first hardware component to the first personality; and store the second portion of the first firmware image to a third region of the persistent storage of the first hardware component, wherein the third region is designated as storing firmware instruction for core operations of the first hardware component. In additional IHS embodiments, execution of the instructions further causes the remote access controller to: parse the second firmware image to identify a portion of the second firmware image comprising instructions for operation of the first hardware component according to the second personality and also to identify a second portion of the second firmware image comprising firmware instructions for core operations of the first hardware component; and forgo storing the second portion of the second firmware image to the persistent storage of the first hardware component when the firmware instructions of the second firmware image for core operations of the first hardware component are identical to firmware instructions stored in the third region of the persistent storage of the first hardware component. In additional IHS embodiments, the firmware instructions for core operations of the first hardware component comprise firmware instructions implementing I/O capabilities of the first hardware component. In additional IHS embodiments, the firmware instructions for core operations of the first hardware component comprise firmware instructions implementing security operations by the first hardware component. In additional IHS embodiments, execution of the instructions further causes the remote access controller to: detect a manual configuration of the IHS by an administrator, and where the configuration modifies operations by the first hardware component, and wherein the generated notification of the first firmware stored by the first hardware component comprises a notification provided to the administrator that is manually configuring the IHS. In additional IHS embodiments, the first hardware component comprise a network controller, and wherein the manual configuration of the IHS by the administrator comprises a configuration of a communication protocol used by the network controller, and wherein the notification provides to the administrator comprises a user interface notification informing the administrator of locally stored firmware by the network controller that supports operation according to the configured communication protocol. In additional IHS embodiments, the first hardware component comprise an SSD, and wherein the manual configuration of the IHS by the administrator comprises a configuration of security protocols employed by the SSD, and wherein the notification provides to the administrator comprises a user interface notification informing the administrator of locally stored firmware by the SSD that supports the configured security protocols. In additional IHS embodiments, execution of the instructions further causes the remote access controller to: maintain a mapping of firmware stored in the first region, second region and third region of the persistent storage of the first hardware component, wherein the mapping is used to generate the notification the first firmware stored by the first hardware component.

In various additional embodiments, methods are provided for personality based updates to firmware utilized by a hardware component of an IHS (Information Handling System), wherein the firmware updates are managed by a remote access controller of the IHS that provides remote management of the hardware component, the method comprising: receiving, by the remote access controller, a first firmware image comprising first firmware that adapts the hardware component for operation according to a first personality; storing, by the remote access controller, at least a portion of the first firmware to a first region of a persistent storage of the hardware component, wherein the first region is designated as storing firmware for adapting the first hardware component to the first personality; receiving, by the remote access controller, a second firmware image comprising second firmware that adapts the hardware component for operation according to a second personality; storing, by the remote access controller, at least a portion of the second firmware to a second region of the persistent storage of the hardware component, wherein the second region is designated as storing firmware for adapting the hardware component to the second personality; and in response to a detected reconfiguration of the IHS, generating a notification of the first firmware that is stored by the first hardware component and usable to adapt operation of the first hardware component to the first personality and generate a notification of the second firmware that is stored by the hardware component and usable to adapt operation of the hardware component to the second personality.

Additional method embodiments may further include: parsing the first firmware image to identify a first portion of the first firmware image comprising instructions for operation of the hardware component according to the first personality and also to identify a second portion of the first firmware image comprising firmware instructions for core operations of the hardware component, wherein the first portion of the first firmware image is stored to the first region of the persistent storage of the hardware component that is designated as storing firmware for adapting the hardware component to the first personality; and storing the second portion of the first firmware image to a third region of the persistent storage of the hardware component, wherein the third region is designated as storing firmware instruction for core operations of the hardware component. Additional method embodiments may further include: parsing the second firmware image to identify a portion of the second firmware image comprising instructions for operation of the hardware component according to the second personality and also to identify a second portion of the second firmware image comprising firmware instructions for core operations of the hardware component; and forgoing storage of the second portion of the second firmware image to the persistent storage of the hardware component when the firmware instructions in the second firmware image for core operations of the hardware component are identical to firmware instructions stored in the third region of the persistent storage of the hardware component. In additional method embodiments, the firmware instructions for core operations of the hardware component comprise firmware instructions implementing I/O capabilities of the hardware component. Additional method embodiments may further include: detecting a manual configuration of the IHS by an administrator using a remote management interface, and where the configuration modifies operations by the hardware component, and wherein the generated notifications of firmware stored by the hardware component comprise notification that are provided to the administrator that is manually configuring the IHS.

In various additional embodiments, systems may include: a hardware component of an Information Handling System (IHS), wherein the hardware component comprises a persistent storage, and wherein the hardware component may be adapted to operate according to a first personality through operation of a first firmware; and a remote access controller supporting remote management of the hardware component of the IHS, the remote access controller comprising a logic unit and a memory device having instructions stored thereon that, upon execution by the logic unit, cause the remote access controller to: receive a first firmware image comprising the first firmware; determine a personality of the first firmware; store at least a portion of the first firmware to a first region of the persistent storage of the first hardware component, wherein the first region is designated as storing firmware for adapting the hardware component to the first personality; and in response to a detected reconfiguration of the IHS, generate a notification of the first firmware that is stored by the hardware component and usable to adapt operation of the hardware component to the first personality.

In additional system embodiments, the hardware component may be adapted to operation according to a second personality through operation of a second firmware and wherein execution of the instructions further causes the remote access controller to: receive a second firmware image comprising the second firmware; determine a personality of the second firmware; and store at least a portion of the second firmware to a second region of the persistent storage of the hardware component, wherein the second region is designated as storing firmware for adapting the hardware component to the second personality. In additional system embodiments, execution of the instructions further causes the remote access controller to: parse the first firmware image to identify a first portion of the first firmware image comprising instructions for operation of the hardware component according to the first personality and also to identify a second portion of the first firmware image comprising firmware instructions for core operations of the hardware component, wherein the first portion of the first firmware image is stored to the first region of the persistent storage of the hardware component that is designated as storing firmware for adapting the hardware component to the first personality; and store the second portion of the first firmware image to a third region of the persistent storage of the hardware component, wherein the third region is designated as storing firmware instruction for core operations of the hardware component. In additional system embodiments, execution of the instructions further causes the remote access controller to: parse the second firmware image to identify a portion of the second firmware image comprising instructions for operation of the hardware component according to the second personality and also to identify a second portion of the second firmware image comprising firmware instructions for core operations of the hardware component; and forgo storing the second portion of the second firmware image to the persistent storage of the hardware component when the firmware instructions of the second firmware image for core operations of the hardware component are identical to firmware instructions stored in the third region of the persistent storage of the hardware component. In additional system embodiments, the firmware instructions for core operations of the hardware component comprise firmware instructions implementing I/O capabilities of the hardware component.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Figure 1:
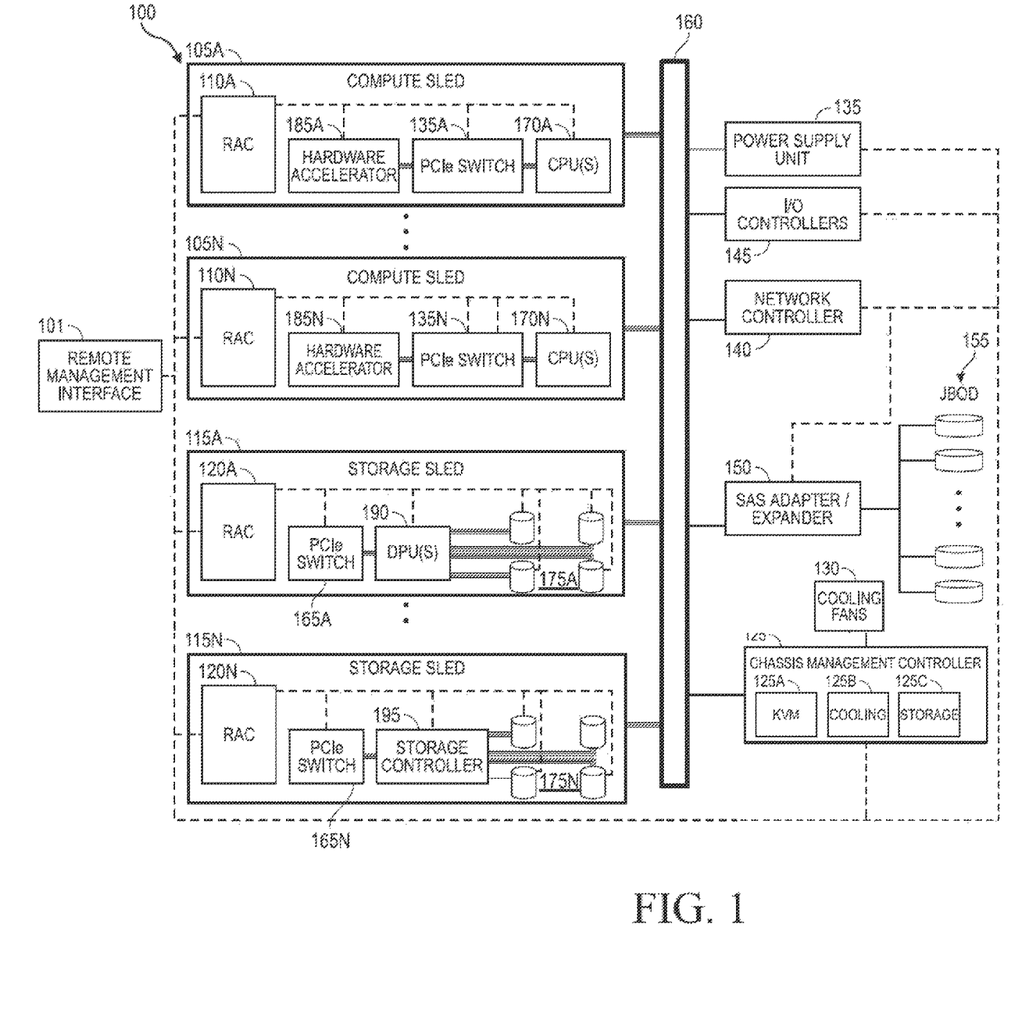
FIG. 1 is a diagram illustrating certain components of a chassis configured, according to some embodiments, for personality based updates to firmware used by IHSs installed in the chassis.

FIG. 1 is a block diagram illustrating certain components of a chassis 100 comprising one or more compute sleds 105a-n and one or more storage sleds 115a-n that may be configured to implement the systems and methods described herein for personality based updates to firmware used by IHSs installed in the chassis 100. Embodiments of chassis 100 may include a wide variety of hardware configurations in which one or more IHS 105a-n, 115a-n are installed in chassis 100. Such variations in hardware configuration may result from chassis 100 being factory assembled to include components specified by a customer that has contracted for manufacture and delivery of chassis 100. Upon delivery and deployment of a chassis 100, the chassis 100 may be modified by replacing and/or adding various hardware components, in addition to replacement of the removeable IHSs 105a-n, 115a-n that are installed in the chassis. In addition, once the chassis 100 has been deployed, firmware used by individual hardware components of the IHSs 105a-n, 115a-n, or by other hardware components of chassis 100, may be modified in order to update the operations that are supported by these hardware components.

Chassis 100 may include one or more bays that each receive an individual sled (that may be additionally or alternatively referred to as a tray, blade, and/or node) IHSs, such as compute sleds 105a-n and storage sleds 115a-n. Chassis 100 may support a variety of different numbers (e.g., 4, 8, 16, 32), sizes (e.g., single-width, double-width) and physical configurations of bays. Embodiments may include additional types of sleds that provide various storage, power and/or processing capabilities. For instance, sleds installable in chassis 100 may be dedicated to providing power management or networking functions. Sleds may be individually installed and removed from the chassis 100, thus allowing the computing and storage capabilities of a chassis to be reconfigured by swapping the sleds with different types of sleds, in some cases at runtime without disrupting the ongoing operations of the other sleds installed in the chassis 100.

Multiple chassis 100 may be housed within a rack. Data centers may utilize large numbers of racks, with various different types of chassis installed in various configurations of racks. The modular architecture provided by the sleds, chassis and racks allow for certain resources, such as cooling, power and network bandwidth, to be shared by the compute sleds 105a-n and storage sleds 115a-n, thus providing efficiency improvements and supporting greater computational loads. For instance, certain computational tasks, such as computations used in machine learning and other artificial intelligence systems, may utilize computational and/or storage resources that are shared within an IHS, within an individual chassis 100 and/or within a set of IHSs that may be spread across multiple chassis of a data center.

Implementing computing systems that span multiple processing components of chassis 100 is aided by high-speed data links between these processing components, such as PCIe connections that form one or more distinct PCIe switch fabrics that are implemented by PCIe switches 135a-n, 165a-n installed in the IHSs 105a-n, 115a-n of the chassis. These high-speed data links may be used to support algorithm implementations that span multiple processing, networking and storage components of an IHS and/or chassis 100. For instance, computational tasks may be delegated to a specific processing component of an IHS, such as to a hardware accelerator 185a-n that may include one or more programmable processors that operate separate from the main CPUs 170a-n of computing sleds 105a-n. In various embodiments, such hardware accelerators 185a-n may include DPUs (Data Processing Units), GPUs (Graphics Processing Units), SmartNICs (Smart Network Interface Card) and/or FPGAs (Field Programmable Gate Arrays). These hardware accelerators 185a-n operate according to firmware instructions that may be occasionally updated, such as to adapt the capabilities of the respective hardware accelerators 185a-n to specific computing tasks. As described in additional detail below, firmware updates to hardware accelerators 185a-n may serve to adapt the personality of a hardware accelerator, thus adapting the hardware accelerator for a particular computing function, or for a particular operating environment.

Chassis 100 may be installed within a rack structure that provides at least a portion of the cooling utilized by the IHSs 105a-n, 115a-n installed in chassis 100. In supporting airflow cooling, a rack may include one or more banks of cooling fans that may be operated to ventilate heated air from within the chassis 100 that is housed within the rack. The chassis 100 may alternatively or additionally include one or more cooling fans 130 that may be similarly operated to ventilate heated air away from sleds 105a-n, 115a-n installed within the chassis. In this manner, a rack and a chassis 100 installed within the rack may utilize various configurations and combinations of cooling fans to cool the sleds 105a-n, 115a-n and other components housed within chassis 100.

The sleds 105a-n, 115a-n may be individually coupled to chassis 100 via connectors that correspond to the bays provided by the chassis 100 and that physically and electrically couple an individual sled to a backplane 160. Chassis backplane 160 may be a printed circuit board that includes electrical traces and connectors that are configured to route signals between the various components of chassis 100 that are connected to the backplane 160 and between different components mounted on the printed circuit board of the backplane 160. In the illustrated embodiment, the connectors for use in coupling sleds 105a-n, 115a-n to backplane 160 include PCIe couplings that support high-speed data links with the sleds 105a-n, 115a-n. In various embodiments, backplane 160 may support various types of connections, such as cables, wires, midplanes, connectors, expansion slots, and multiplexers. In certain embodiments, backplane 160 may be a motherboard that includes various electronic components installed thereon. Such components installed on a motherboard backplane 160 may include components that implement all or part of the functions described with regard to the SAS (Serial Attached SCSI) expander 150, I/O controllers 145, network controller 140, chassis management controller 125 and power supply unit 135.

Figure 2:
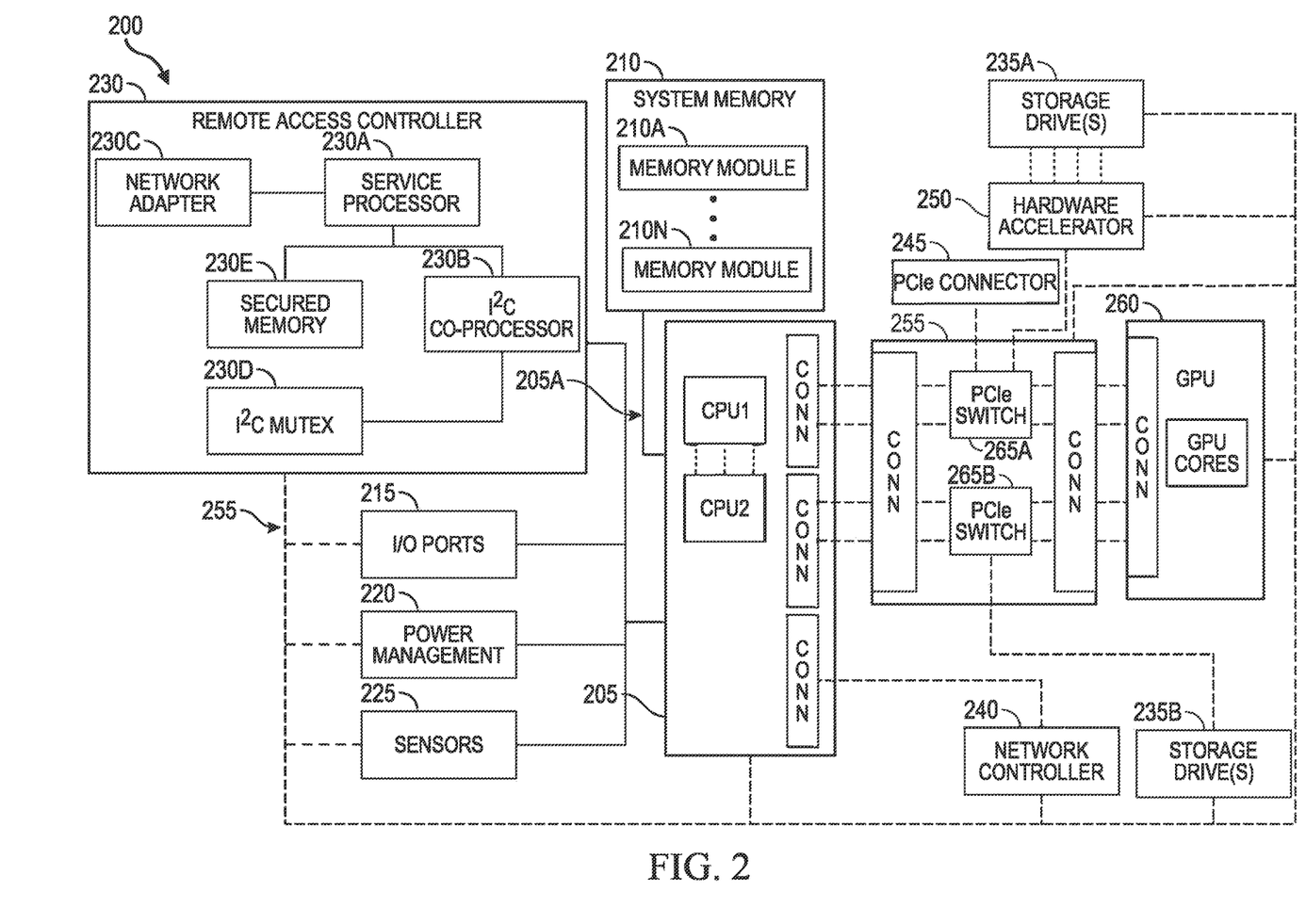
FIG. 2 is a diagram illustrating certain components of an IHS configured, according to some embodiments, for personality based updates to firmware used by hardware components of the IHS.

In certain embodiments, each individual sled 105a-n, 115a-n—n may be an IHS such as described with regard to IHS 200 of FIG. 2. Sleds 105a-n, 115a-n may individually or collectively provide computational processing resources that may be used to support a variety of e-commerce, multimedia, business and scientific computing applications, such as artificial intelligence systems provided via cloud computing implementations. Sleds 105a-n, 115a-n are typically configured with hardware and software that provide leading-edge computational capabilities. Accordingly, services that are provided using such computing capabilities are typically provided as high-availability systems that operate with minimum downtime.

In high-availability computing systems, such as may be implemented using embodiments of chassis 100, any downtime that can be avoided is preferred. As described above, firmware updates are an expected in the administration and operation of data centers, but it is preferable to avoid any downtime in making such firmware updates. For instance, in updating the firmware of the individual hardware components of the chassis 100, it is preferable that such updates can be made as quickly as possible, such that the hardware component, and in some cases the entire chassis, are out of service for as little time as possible. Firmware images may be relatively large files that may take several minutes to transmit to the hardware component being updated.

As described in additional detail below, firmware updates may be used to adapt the behavior of a hardware component for a particular computing task, or for operation in a particular logical environment, thus adopting a specialized "personality" for the operation of the hardware component. For instance, a network controller 140 may be adapted for operation using either Ethernet or InfiniBand protocols, where the adaptations may be made via an update to the firmware utilized to operate the network controller 140. Firmware images transmitted to a hardware component, such as network controller 140, may include instructions for operation according to multiple personalities, such as instructions that allow the network controller to switch between use of Ethernet and InfiniBand protocols. Supporting even two different personalities for a hardware device in this manner results in several issues.

First, a firmware image may take tens of minutes to transmit to a hardware component, regardless of the signaling pathway used for the transmission. During this interval during which the firmware image is being transmitted, numerous types of errors can occur in the IHS, elsewhere within a shared chassis, in the remote access controller, in the hardware component being updated and/or in another hardware component that shares use of the signaling pathway being used to transmit the firmware image. Due to such errors during transmission of the firmware image, the hardware component being updated may be left in an undefined and/or inoperable state that requires manual administration of the device, and in some instances, may render the managed hardware component permanently inoperable. Accordingly, the less time it takes to transmit a firmware image to the hardware component being updated, the less time there is for such error conditions to occur that can remove a chassis and/or hardware components out of service. Second, a managed hardware component of may have limited amounts of storage space in which to store multiple firmware images, such that expansive firmware images supporting multiple different personalities may not be accommodated by the hardware component. As described in additional detail below, through operation of a remote access controller 110a-n, 120a-n, embodiments support capabilities by personality based firmware images may be managed and selectively stored by managed hardware components in a manner that supports efficient use of storage capabilities and allows the hardware component to quickly transition between supported personalities.

As illustrated, each sled 105a-n, 115a-n includes a respective remote access controller (RAC) 110a-n, 120a-n. As described in additional detail with regard to FIG. 2, remote access controller 110a-n, 120a-n provides capabilities for remote monitoring and management of a respective sled 105a-n, 115a-n and/or of chassis 100. In support of these monitoring and management functions, remote access controllers 110a-n may utilize both in-band and side-band (i.e., out-of-band) communications with various managed components of a respective sled 105a-n and chassis 100. Remote access controllers 110a-n, 120a-n may collect various types of sensor data, such as collecting temperature sensor readings that are used in support of airflow cooling of the chassis 100 and the sleds 105a-n, 115a-n. In addition, each remote access controller 110a-n, 120a-n may implement various monitoring and administrative functions related to a respective sleds 105a-n, 115a-n, where these functions may be implemented using sideband bus connections with various internal components of the chassis 100 and of the respective sleds 105a-n, 115a-n. As described in additional detail below, in various embodiments, these capabilities of the remote access controllers 110a-n, 120a-n may be utilized in updating the firmware of hardware components of chassis 100 and/or of hardware components of the sleds 110a-n, 120a-n, without having to reboot the chassis or any of the sleds 110a-n, 120a-n.

The remote access controllers 110a-n, 120a-n that are present in chassis 100 may support secure connections with a remote management interface 101. In some embodiments, remote management interface 101 provides a remote administrator with various capabilities for remotely administering the operation of an IHS, including initiating updates to the firmware used by hardware components installed in the chassis 100. For example, remote management interface 101 may provide capabilities by which an administrator can initiate updates to the firmware utilized by all of the storage drives 175a-n installed in a chassis 100, or to the firmware utilized by all of the storage drives 175a-n of a particular model or manufacturer. In some instances, remote management interface 101 may include an inventory of the hardware, software and firmware of chassis 100 that is being remotely managed through the operation of the remote access controllers 110a-n, 120a-n. The remote management interface 101 may also include various monitoring interfaces for evaluating telemetry data collected by the remote access controllers 110a-n, 120a-n. In some embodiments, remote management interface 101 may communicate with remote access controllers 110a-n, 120a-n via a protocol such the Redfish remote management interface. In embodiments, remote management interface 101 may also include capabilities for adapting the operations of the chassis 100 and/or IHS 105a-n, 115a-n for a specific computing workload. For instance, remote management interface 101 may be utilized to initiate a transition of all solid state storage drives 175a-n within a cluster from a high-performance computing personality to a personality the implements extensive security protocols, such as in response to an identified threat. In another example, an administrator may utilize a remote management interface 101 to reconfigure an IHS for a new computational workload, where the reconfiguration may include reconfiguration of a network controller 140 from Ethernet to InfiniBand operations.

In the illustrated embodiment, chassis 100 includes one or more compute sleds 105a-n that are coupled to the backplane 160 and installed within one or more bays or slots of chassis 100. Each of the individual compute sleds 105a-n may be an IHS, such as described with regard to FIG. 2. Each of the individual compute sleds 105a-n may include various different numbers and types of processors that may be adapted to performing specific computing tasks. In the illustrated embodiment, each of the compute sleds 105a-n includes a PCIe switch 135a-n that provides access to a hardware accelerator 185a-n, such as the described DPUs, GPUs, Smart NICs and FPGAs, that may be programmed and adapted for specific computing tasks, such as to support machine learning or other artificial intelligence systems. As described in additional detail below, compute sleds 105a-n may include a variety of hardware components, such as hardware accelerator 185a-n and PCIe switches 135a-n, that operate using firmware that may be occasionally updated, such as to adapt these components for operation according to different personalities.

As illustrated, chassis 100 includes one or more storage sleds 115a-n that are coupled to the backplane 160 and installed within one or more bays of chassis 100 in a similar manner to compute sleds 105a-n. Each of the individual storage sleds 115a-n may include various different numbers and types of storage devices. As described in additional detail with regard to FIG. 2, a storage sled 115a-n may be an IHS 200 that includes multiple solid-state drives (SSDs) 175a-n, where the individual storage drives 175a-n may be accessed through a PCIe switch 165a-n of the respective storage sled 115a-n.

As illustrated, a storage sled 115a may include one or more DPUs (Data Processing Units) 190 that provide access to and manage the operations of the storage drives 175a of the storage sled 115a. Use of a DPU 190 in this manner provides low-latency and high-bandwidth access to numerous SSDs 175a. These SSDs 175a may be utilized in parallel through NVMe transmissions that are supported by the PCIe switch 165a that connects the SSDs 175a to the DPU 190. In some instances, PCIe switch 165a may be in integrated component of a DPU 190. The immense data storage and retrieval capabilities provided by such storage sled 115a implementations may be harnessed by offloading storage operations directed as storage drives 175a to a DPU 190a, and thus without relying on the main CPU of the storage sled, or of any other component of chassis 100. As indicated in FIG. 1, chassis 100 may also include one or more storage sleds 115n that provide access to storage drives 175n via a storage controller 195. In some embodiments, storage controller 195 may provide support for RAID (Redundant Array of Independent Disks) configurations of logical and physical storage drives, such as storage drives provided by storage sled 115n. In some embodiments, storage controller 195 may be a HBA (Host Bus Adapter) that provides more limited capabilities in accessing storage drives 175n.

In addition to the data storage capabilities provided by storage sleds 115a-n, chassis 100 may provide access to other storage resources that may be installed components of chassis 100 and/or may be installed elsewhere within a rack that houses the chassis 100. In certain scenarios, such storage resources 155 may be accessed via a SAS expander 150 that is coupled to the backplane 160 of the chassis 100. The SAS expander 150 may support connections to a number of JBOD (Just a Bunch Of Disks) storage drives 155 that, in some instances, may be configured and managed individually and without implementing data redundancy across the various drives 155. The additional storage resources 155 may also be at various other locations within a datacenter in which chassis 100 is installed.

In light of the various manners in which storage drives 175a-n, 155 may be coupled to chassis 100, a wide variety of different storage topologies may be supported. Through these supported topologies, storage drives 175a-n, 155 may be logically organized into clusters or other groupings that may be collectively tasked and managed. In some instances, a chassis 100 may include numerous storage drives 175a-n, 155 that are identical, or nearly identical, such as arrays of SSDs of the same manufacturer and model. Accordingly, any firmware updates to storage drives 175a-n, 155 requires the updates to be applied within each of these topologies being supported by the chassis 100. Despite the large number of different storage drive topologies that may be supported by an individual chassis 100, the firmware used by each of these storage devices 175a-n, 155 may be occasionally updated, such as to adapt these storage devices for operation according to different personalities. In some instances, firmware updates may be limited to a single storage drive, but in other instances, a set of firmware updates may be initiated for a large number of storage drives, such as for all SSDs installed in chassis 100.

As illustrated, the chassis 100 of FIG. 1 includes a network controller 140 that provides network access to the sleds 105a-n, 115a-n installed within the chassis. Network controller 140 may include various switches, adapters, controllers and couplings used to connect chassis 100 to a network, either directly or via additional networking components and connections provided via a rack in which chassis 100 is installed. Network controller 140 operates according to firmware instructions that may be occasionally updated, such as to adapt the network controller for operation according to different personalities.

Chassis 100 may similarly include a power supply unit 135 that provides the components of the chassis with various levels of DC power from an AC power source or from power delivered via a power system provided by a rack within which chassis 100 may be installed. In certain embodiments, power supply unit 135 may be implemented within a sled that may provide chassis 100 with redundant, hot-swappable power supply units. Power supply unit 135 may operate according to firmware instructions that may be occasionally updated, such as to adapt the power supply unit for operation according to different personalities.

Chassis 100 may also include various I/O controllers 140 that may support various I/O ports, such as USB ports that may be used to support keyboard and mouse inputs and/or video display capabilities. Each of the I/O controllers 140 may operate according to firmware instructions that may be occasionally updated, such as to adapt the I/O controller 140 for operation according to different personalities. Such I/O controllers 145 may be utilized by the chassis management controller 125 to support various KVM (Keyboard, Video and Mouse) 125a capabilities that provide administrators with the ability to interface with the chassis 100. The chassis management controller 125 may also include a storage module 125c that provides capabilities for managing and configuring certain aspects of the storage devices of chassis 100, such as the storage devices provided within storage sleds 115a-n and within the JBOD 155.

In addition to providing support for KVM 125a capabilities for administering chassis 100, chassis management controller 125 may support various additional functions for sharing the infrastructure resources of chassis 100. In some scenarios, chassis management controller 125 may implement tools for managing the power 135, network bandwidth 140 and airflow cooling 130 that are available via the chassis 100. As described, the airflow cooling 130 utilized by chassis 100 may include an airflow cooling system that is provided by a rack in which the chassis 100 may be installed and managed by a cooling module 125b of the chassis management controller 125.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

FIG. 2 illustrates an example of an IHS 200 configured to implement systems and methods described herein for personality based updates to firmware used by the IHS 200. It should be appreciated that although the embodiments described herein may describe an IHS that is a compute sled or similar computing component that may be deployed within the bays of a chassis, a variety of other types of IHSs, such as laptops and portable devices, may also operate according to embodiments described herein. In the illustrative embodiment of FIG. 2, IHS 200 may be a computing component, such as sled 105a-n, 115a-n or other type of server, such as an 1 RU server installed within a 2RU chassis, that is configured to share infrastructure resources provided within a chassis 100.

IHS 200 may utilize one or more system processors 205, that may be referred to as CPUs (Central Processing Units). In some embodiments, CPUs 205 may each include a plurality of processing cores that may be separately delegated with computing tasks. Each of the CPUs 205 may be individually designated as a main processor and as a co-processor, where such designations may be based on delegation of specific types of computational tasks to a CPU 205. In some embodiments, CPUs 205 may each include an integrated memory controller that may be implemented directly within the circuitry of each CPU 205. In some embodiments, a memory controller may be a separate integrated circuit that is located on the same die as the CPU 205. Each memory controller may be configured to manage the transfer of data to and from a system memory 210 of the IHS, in some cases using a high-speed memory bus 205a. The system memory 210 is coupled to CPUs 205 via one or more memory buses 205a that provide the CPUs 205 with high-speed memory used in the execution of computer program instructions by the CPUs 205. Accordingly, system memory 210 may include memory components, such as static RAM (SRAM), dynamic RAM (DRAM), NAND Flash memory, suitable for supporting high-speed memory operations by the CPUs 205. In certain embodiments, system memory 210 may combine persistent non-volatile memory and volatile memory.

In certain embodiments, the system memory 210 may be comprised of multiple removable memory modules. The system memory 210 of the illustrated embodiment includes removable memory modules 210a-n. Each of the removable memory modules 210a-n may correspond to a printed circuit board memory socket that receives a removable memory module 210a-n, such as a DIMM (Dual In-line Memory Module), that can be coupled to the socket and then decoupled from the socket as needed, such as to upgrade memory capabilities or to replace faulty memory modules. Other embodiments of IHS system memory 210 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 200 may utilize a chipset that may be implemented by integrated circuits that are connected to each CPU 205. All or portions of the chipset may be implemented directly within the integrated circuitry of an individual CPU 205. The chipset may provide the CPU 205 with access to a variety of resources accessible via one or more in-band buses. IHS 200 may also include one or more I/O ports 215 that may be used to couple the IHS 200 directly to other IHSs, storage resources, diagnostic tools, and/or other peripheral components. A variety of additional components may be coupled to CPUs 205 via a variety of in-line busses. For instance, CPUs 205 may also be coupled to a power management unit 220 that may interface with a power system of the chassis 100 in which IHS 200 may be installed. In addition, CPUs 205 may collect information from one or more sensors 225 via a management bus.

In certain embodiments, IHS 200 may operate using a BIOS (Basic Input/Output System) that may be stored in a non-volatile memory accessible by the CPUs 205. The BIOS may provide an abstraction layer by which the operating system of the IHS 200 interfaces with hardware components of the IHS. Upon powering or restarting IHS 200, CPUs 205 may utilize BIOS instructions to initialize and test hardware components coupled to the IHS, including both components permanently installed as components of the motherboard of IHS 200 and removable components installed within various expansion slots supported by the IHS 200. The BIOS instructions may also load an operating system for execution by CPUs 205. In certain embodiments, IHS 200 may utilize Unified Extensible Firmware Interface (UEFI) in addition to or instead of a BIOS. In certain embodiments, the functions provided by a BIOS may be implemented, in full or in part, by the remote access controller 230.

In some embodiments, IHS 200 may include a TPM (Trusted Platform Module) that may include various registers, such as platform configuration registers, and a secure storage, such as an NVRAM (Non-Volatile Random-Access Memory). The TPM may also include a cryptographic processor that supports various cryptographic capabilities. In IHS embodiments that include a TPM, a pre-boot process implemented by the TPM may utilize its cryptographic capabilities to calculate hash values that are based on software and/or firmware instructions utilized by certain core components of IHS, such as the BIOS and boot loader of IHS 200. These calculated hash values may then be compared against reference hash values that were previously stored in a secure non-volatile memory of the IHS, such as during factory provisioning of IHS 200. In this manner, a TPM may establish a root of trust that includes core components of IHS 200 that are validated as operating using instructions that originate from a trusted source.

As illustrated, CPUs 205 may be coupled to a network controller 240, such as provided by a Network Interface Controller (NIC) card that provides IHS 200 with communications via one or more external networks, such as the Internet, a LAN, or a WAN. In some embodiments, network controller 240 may be a replaceable expansion card or adapter that is coupled to a connector (e.g., PCIe connector of a motherboard, backplane, midplane, etc.) of IHS 200. In some embodiments, network controller 240 may support high-bandwidth network operations by the IHS 200 through a PCIe interface that is supported by the chipset of CPUs 205. Network controller 240 may operate according to firmware instructions that may be occasionally updated, such as to adapt network controller 240 for operation according to different personalities. Such as the described reconfiguration of a network controller 240 between support for InfiniBand or Ethernet protocols.

As indicated in FIG. 2, in some embodiments, CPUs 205 may be coupled to a PCIe card 255 that includes two PCIe switches 265*a-b* that operate as I/O controllers for PCIe communications, such as TLPs (Transaction Layer Packets), that are transmitted between the CPUs 205 and PCIe devices and systems coupled to IHS 200. Whereas the illustrated embodiment of FIG. 2 includes two CPUs 205 and two PCIe switches 265*a-b*, different embodiments may operate using different numbers of CPUs and PCIe switches. In addition to serving as I/O controllers that route PCIe traffic, PCIe switches 265*a-b* include switching logic that can be used to expand the number of PCIe connections that are supported by CPUs 205. PCIe switches 265*a-b* may multiply the number of PCIe lanes available to CPUs 205, thus allowing more PCIe devices to be connected to CPUs 205, and for the available PCIe bandwidth to be allocated with greater granularity. Each of the PCIe switches 265*a-b* may operate according to firmware instructions that may be occasionally updated, such as to adapt the PCIe switches for operation according to different personalities.

Using the available PCIe lanes, the PCIe switches 265*a-b* may be used to implement a PCIe switch fabric. Also through this switch fabric, PCIe NVMe (Non-Volatile Memory Express) transmission may be supported and utilized in high-speed communications with SSDs, such as storage drives 235*a-b*, of the IHS 200. Also through this switch fabric, PCIe VDM (Vendor Defined Messaging) may be supported and utilized in managing PCIe-compliant hardware components of the IHS 200, such as in updating the firmware utilized by the hardware components.

As indicated in FIG. 2, IHS 200 may support storage drives 235*a-b* in various topologies, in the same manner as described with regard to the chassis 100 of FIG. 1. In the illustrated embodiment, storage drives 235*a* are accessed via a hardware accelerator 250, while storage drives 235*b* are accessed directly via PCIe switch 265*b*. In some embodiments, the storage drives 235*a-b* of IHS 200 may include a combination of both SSD and magnetic disk storage drives. In other embodiments, all of the storage drives 235*a-b* of IHS 200 may be identical, or nearly identical. In all embodiments, storage drives 235*a-b* operate according to firmware instructions that may be occasionally updated, such as to adapt the storage drives 235*a-b* for operation according to different personalities.

As illustrated, PCIe switch 265*a* is coupled via a PCIe link to a hardware accelerator 250, such as a DPU, Smart-NIC, GPU and/or FPGA, that may be a connected to the IHS via a removeable card or baseboard that couples to a PCIe connector of the IHS 200. In some embodiments, hardware accelerator 250 includes a programmable processor that can be configured for offloading functions from CPUs 205. In some embodiments, hardware accelerator 250 may include a plurality of programmable processing cores and/or hardware accelerators, that may be used to implement functions used to support devices coupled to the IHS 200. In some embodiments, the processing cores of hardware accelerator 250 include ARM (advanced RISC (reduced instruction set computing) machine) processing cores. In other embodiments, the cores of DPUs 250*a-b* may include MIPS (microprocessor without interlocked pipeline stages) cores, RISC-V cores, or CISC (complex instruction set computing) (i.e., x86) cores. Hardware accelerator may operate according to firmware instructions that may be occasionally updated, such as to adapt the hardware accelerator 250 for operation according to different personalities.

In the illustrated embodiment, the programmable capabilities of hardware accelerator 250 implements functions used to support storage drives 235*a*, such as SSDs. In such storage drive topologies, hardware accelerator 250 may implement processing of PCIe NVMe communications with SSDs 235*a*, thus supporting high-bandwidth connections with these SSDs. Hardware accelerator 250 may also include one more memory devices used to store program instructions executed by the processing cores and/or used to support the operation of SSDs 235*a* such as in implementing cache memories and buffers utilized in support high-speed operation of these storage drives, and in some cases may be used to provide high-availability and high-throughput implementations of the read, write and other I/O operations that are supported by these storage drives 235*a*. In other embodiments, hardware accelerator 250 may implement operations in support of other types of devices and may similarly support high-bandwidth PCIe connections with these devices. For instance, in various embodiments, hardware accelerator 250 may support high-bandwidth connections, such as PCIe connections, with networking devices in implementing functions of a network switch, compression and codec functions, virtualization operations or cryptographic functions. As described, in some embodiments, hardware accelerators 250 may be adapted for operation according to different personalities through the use of firmware updates. For instance, a firmware update may adapt the hardware accelerator 250 for offloading particular storage operations directed at storage drives 235a, while another firmware update may adapt the hardware accelerator 250 for offloading machine learning or other artificial intelligence operations that utilize the storage drives 235a.

As illustrated in FIG. 2, PCIe switches 265a-b may also support PCIe couplings with one or more GPUs (Graphics Processing Units) 260. Embodiments may include one or more GPU cards, where each GPU card is coupled to one or more of the PCIe switches 265a-b, and where each GPU card may include one or more GPUs 260. In some embodiments, PCIe switches 265a-b may transfer instructions and data for generating video images by the GPUs 260 to and from CPUs 205. Accordingly, GPUs 260 may include on or more hardware-accelerated processing cores that are optimized for performing streaming calculation of vector data, matrix data and/or other graphics data, thus supporting the rendering of graphics for display on devices coupled either directly or indirectly to IHS 200. In some instances, GPUs may be utilized as programmable computing resources for offloading other functions from CPUs 205, in the same manner as hardware accelerator 250. GPUs 260 may operate according to firmware instructions that may be occasionally updated, such as to adapt GPUs 260 for operation according to different personalities.

As illustrated in FIG. 2, PCIe switches 265a-b may support PCIe connections in addition to those utilized by GPUs 260 and hardware accelerator 250, where these connections may include PCIe links of one or more lanes. For instance, PCIe connectors 245 supported by a printed circuit board of IHS 200 may allow various other systems and devices to be coupled to the IHS. Through couplings to PCIe connectors 245a, a variety of data storage devices, graphics processors and network interface cards may be coupled to IHS 200, thus supporting a wide variety of topologies of devices that may be coupled to the IHS 200.

As described, IHS 200 includes a remote access controller 230 that supports remote management of IHS 200 and of various internal components of IHS 200. In certain embodiments, remote access controller 230 may operate from a different power plane from the processors 205 and other components of IHS 200, thus allowing the remote access controller 230 to operate, and management tasks to proceed, while the processing cores of IHS 200 are powered off. Various functions provided by the BIOS, including launching the operating system of the IHS 200, and/or functions of a TPM may be implemented or supplemented by the remote access controller 230. In some embodiments, the remote access controller 230 may perform various functions to verify the integrity of the IHS 200 and its hardware components prior to initialization of the operating system of IHS 200 (i.e., in a bare-metal state). In some embodiments, certain operations of the remote access controller 230, such as the operations described herein for updating firmware used by managed hardware components of IHS 200, may operate using validated instructions, and thus within the root of trust of IHS 200.

In some embodiments, remote access controller 230 may include a service processor 230a, or specialized microcontroller, that operates management software that supports remote monitoring and administration of IHS 200. The management operations supported by remote access controller 230 may be remotely initiated, updated and monitored via a remote management interface 101, such as described with regard to FIG. 1. Remote access controller 230 may be installed on the motherboard of IHS 200 or may be coupled to IHS 200 via an expansion slot or other connector provided by the motherboard. In some instances, the management functions of the remote access controller 255 may utilize information collected by various managed sensors 225 located within the IHS. For instance, temperature data collected by sensors 225 may be utilized by the remote access controller 230 in support of closed-loop airflow cooling of the IHS 200. As indicated, remote access controller 230 may include a secured memory 230e for exclusive use by the remote access controller in support of management operations.

In some embodiments, remote access controller 230 may implement monitoring and management operations using MCTP (Management Component Transport Protocol) messages that may be communicated to managed devices 205, 235a-b, 240, 250, 255, 260 via management connections supported by a sideband bus 255. In some instances, the sideband management connections supported by remote access controller 230 may include PLDM (Platform Level Data Model) management communications with the managed devices 205, 235a-b, 240, 250, 255, 260 of IHS 200. In some embodiments, the remote access controller 230 may additionally or alternatively use MCTP messaging to transmit Vendor Defined Messages (VDMs) via the in-line PCIe switch fabric supported by PCIe switches 265a-b.

As described in additional detail below, remote access controller 230 embodiments may support capabilities for managing personality based firmware updates to managed hardware components 205, 235a-b, 240, 250, 255, 260. In embodiments, remote access controller 230 receives updates for firmware that is utilized by managed hardware components 205, 235a-b, 240, 250, 255, 260. Remote access controller 230 may then transmit all or part of the received firmware to a managed hardware component 205, 235a-b, 240, 250, 255, 260, where it may be stored by the managed component according to the personality for the managed component that is activated by operation of the updated firmware. In embodiments, the remote access controller 230 may transmit firmware to managed devices utilizing inband signaling, such as VDMs that are transmitted using MCTP over the PCIe switch fabric that is implemented by PCIe switch 255, and/or utilizing sideband signaling, such as PLDM communications transmitted via sideband connections 255 supported by an I2C co-processor 230b of the remote access controller 230.

As illustrated, remote access controller 230 may include a network adapter 230c that provides the remote access controller with network access that is separate from the network controller 240 utilized by other hardware components of the IHS 200. Through secure connections supported by network adapter 230c, remote access controller 230 communicates management information with remote management interface 101. In support of remote monitoring functions, network adapter 230c may support connections between remote access controller 255 and external management tools using wired and/or wireless network connections that operate using a variety of network technologies. As a non-limiting example of a remote access controller, the integrated Dell Remote Access Controller (iDRAC) from Dell® is embedded within Dell servers and provides functionality that helps information technology (IT) administrators deploy, update, monitor, and maintain servers remotely.

Remote access controller 230 supports monitoring and administration of the managed devices of an IHS via a sideband bus interface 255. For instance, messages utilized in device and/or system management may be transmitted using I2C sideband bus 255 connections that may be individually established with each of the respective managed devices 205, 235a-b, 240, 250, 255, 260 of the IHS 200 through the operation of an I2C multiplexer 230d of the remote access controller. As illustrated in FIG. 2, the managed devices 205, 235a-b, 240, 250, 255, 260 of IHS 200 are coupled to the CPUs 205, either directly or directly, via in-line buses that are separate from the I2C sideband bus 255 connections used by the remote access controller 230 for device management.

In certain embodiments, the service processor 230a of remote access controller 230 may rely on an I2C co-processor 230b to implement sideband I2C communications between the remote access controller 230 and the managed hardware components 205, 235a-b, 240, 250, 255, 260 of the IHS 200. The I2C co-processor 230b may be a specialized co-processor or micro-controller that is configured to implement a I2C bus interface used to support communications with managed hardware components 205, 235a-b, 240, 250, 255, 260 of IHS. In some embodiments, the I2C co-processor 230b may be an integrated circuit on the same die as the service processor 230a, such as a peripheral system-on-chip feature that may be provided by the service processor 230a. The sideband I2C bus 255 is illustrated as single line in FIG. 2. However, sideband bus 255 may be comprises of multiple signaling pathways, where each may be comprised of a clock line and data line that couple the remote access controller 230 to I2C endpoints 205, 235a-b, 240, 250, 255, 260.

In various embodiments, an IHS 200 does not include each of the components shown in FIG. 2. In various embodiments, an IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 205 as a systems-on-a-chip.

Figure 3:
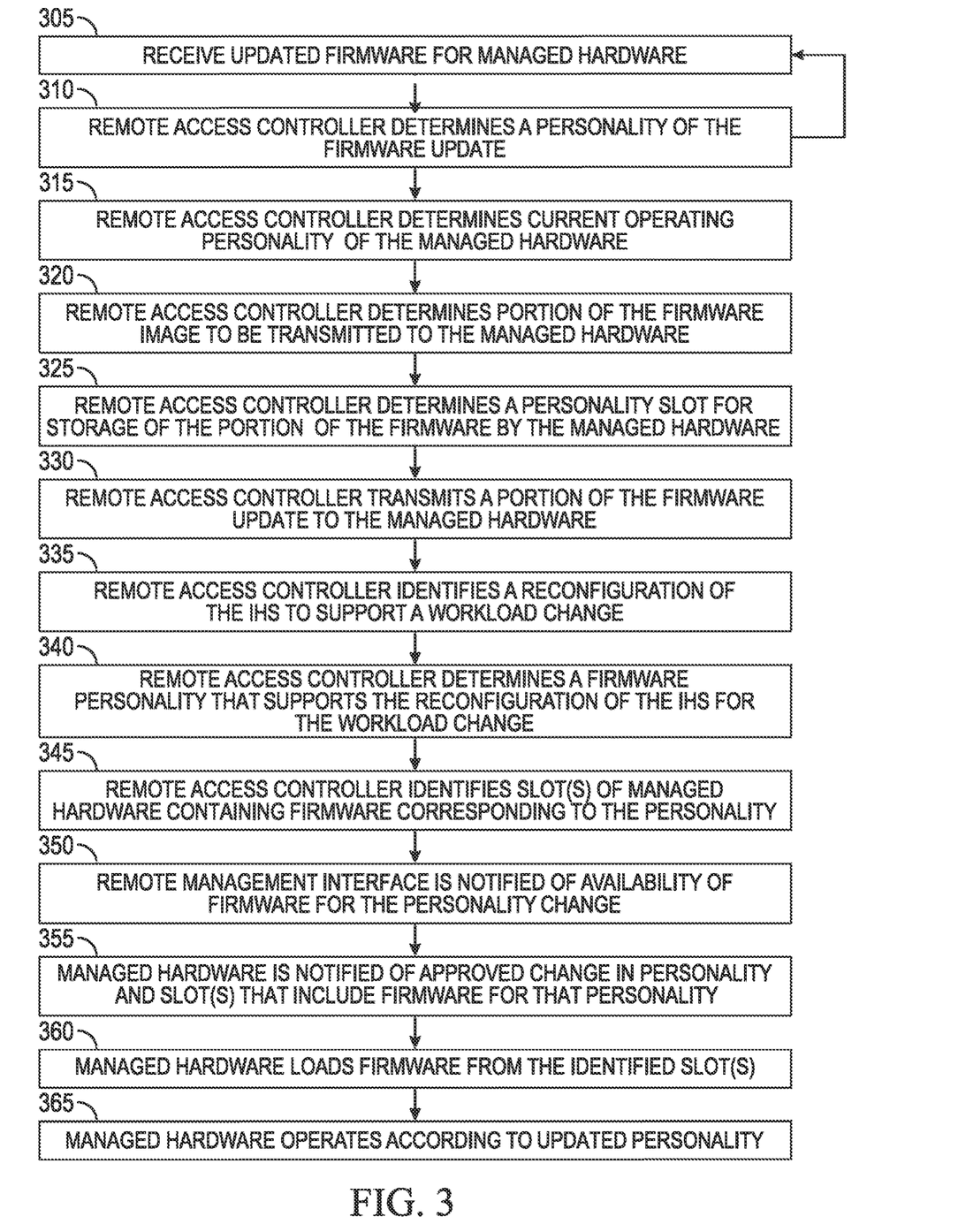
FIG. 3 is a flow chart diagram illustrating certain steps of methods, according to some embodiments, for personality based updates to firmware used by hardware components of an IHS.

FIG. 3 is a flow chart diagram illustrating certain steps of methods, according to some embodiments, for personality based updates to firmware used by hardware components of an IHS, such as the IHSs described with regard to FIGS. 1 and 2. As described with regard to FIG. 1, datacenter administrators may utilize a remote management interface 101 to initiate a variety of management operations on a chassis, IHSs installed the chassis, and managed components of the respective IHSs. In FIG. 3, a remote management interface is utilized to initiate a firmware update for one or more managed hardware components operating within the data center. In particular, the updated firmware for a specific hardware component serves to adapt the operation of that hardware component according to a particular personality.

In some instances, the remote management interface may initiate a firmware update for all storage drives of a particular type that are operating within a data center or within any sub-system of the data center, such as a firmware update for all storage drives of a particular model number that are part of a drive cluster. In another example, the remote management interface may be used to initiate a discrete update to the firmware of a particular device, such as to update the firmware used to configure the programmable capabilities of a hardware accelerator. The remote management interface may initiate an update to the firmware of one or more managed hardware components of an IHS by delivery of the update to a remote access controller of the IHS in which the hardware component to be updated is installed.

Figure 4:
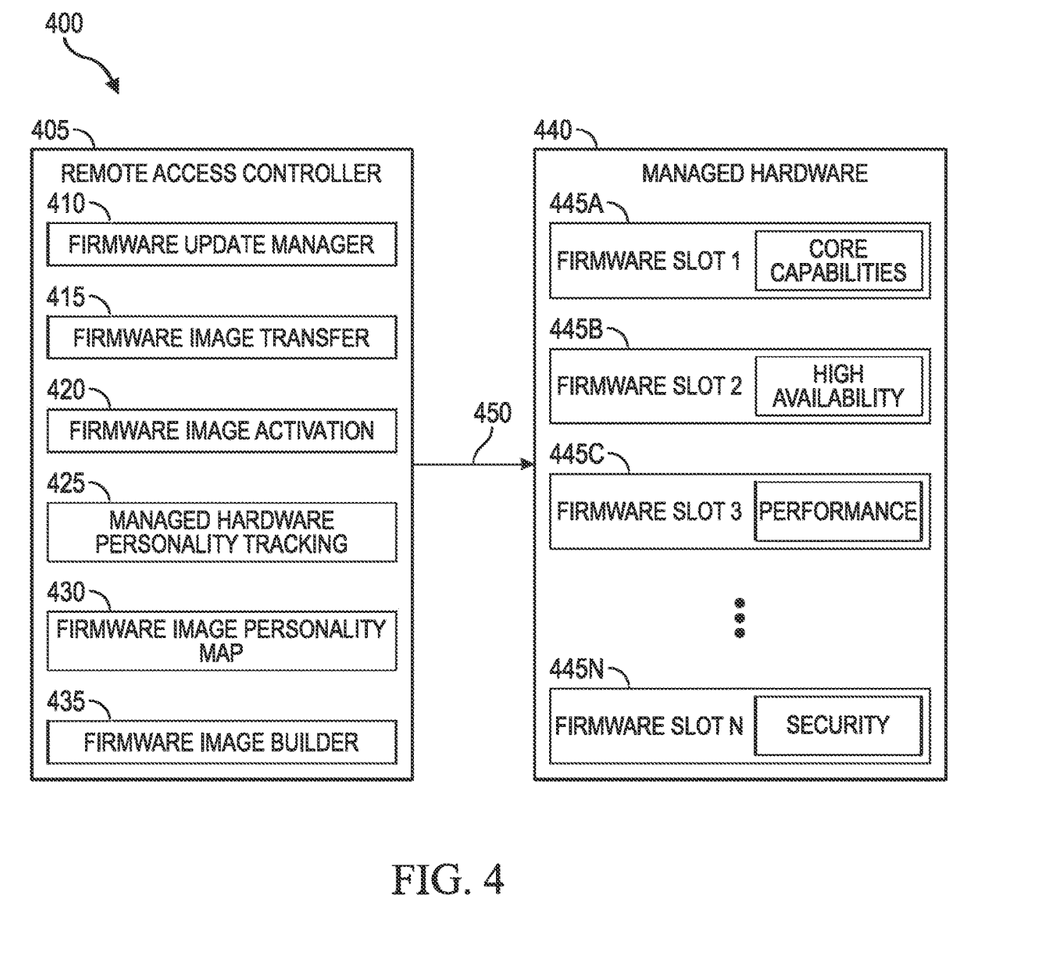
FIG. 4 is a diagram illustrating components of a system, according to some embodiments, for personality based updates to firmware used by hardware components of an IHS.

Embodiments may begin, at 305, with the receipt of a firmware update by a remote access controller of an IHS, where the update includes firmware instructions that are utilized by one or more hardware components installed in the IHS. FIG. 4 is a diagram illustrating some components of a system, according to some embodiments, for personality based updates to firmware used by a hardware component of an IHS. In the system of FIG. 4, a remote access controller 405 of an IHS, such as described with regard to FIGS. 1 and 2, supports firmware updates for a managed hardware component 440 of that IHS. As illustrated in FIG. 4, a remote access controller 405 includes a firmware update manager 410 that may operate within a secure execution environment of the remote access controller and may receive firmware updates from a remote management interface, such as described with regard to FIG. 1.

Upon receipt of the update, at 310, the remote access controller determines a personality that is associated with the firmware update. As described, a firmware update may be used to adjust the operation of a hardware component for a particular task or for operation in a particular environment, thus adopting a specialized personality for the hardware component. In some instances, received firmware updates may be modifications to the firmware of an existing personality that is supported by a hardware component. In other instances, received firmware updates may provide instructions that correspond to a new personality for the hardware component.

In some embodiments, the remote access controller determines the personality associated with a firmware update based on metadata included in the update. In particular, the remote access controller may determine a personality for a firmware update based on a subsystem identification that is included in metadata of the received update. For instance, the subsystem identification included in a firmware update for a network controller may specify the update is for operation of the network controller in a Ethernet subsystem. In another instance, this subsystem identification may instead specify the update is for operation of the network controller in an InfiniBand subsystem. In another example, a firmware update for a storage controller may include a subsystem identification that specifies the update is for operation of the storage controller as a RAID controller, or may include a subsystem identification that specifies the update is for operation of the storage controller as an HBA (Host Bus Adapter).

Upon receiving a firmware update for a managed hardware component, at 315, the remote access controller determines the current personality in which the hardware components is operating. As indicated in FIG. 4, a remote access controller 405 may implement a personality tracking module 425 that monitors operations by the managed hardware component 440 in order to determine the current personality of that hardware component. As described, a remote access controller may utilize both inband and sideband communication channels to interface with managed hardware components of an IHS. Utilizing these capabilities of the remote access controller 405, the personality tracking module 425 collects information that allows a determination of the current operating personality of a managed hardware component 440. In instances where embodiments of the remote access controller 405 have already configured the managed hardware component 440 for operation according to a specific personality, the personality tracking module 425 may query the managed hardware 440 for the subsystem identification(s) associated with firmware that is currently in use by managed hardware.

In other instances, the personality tracking module 425 may utilize the management capabilities of the remote access controller 405 to confirm the current personality of the managed hardware 440. For example, the personality tracking module 425 may query security status information, such as currently enforced authentication requirements and encryption use, of managed hardware 440. Utilize this collected security information, the personality tracking module 425 categorizes the current personality of the managed hardware 440 as a high-security personality. For a managed hardware component 440 that is a storage drive, the personality tracking module 425 may query the storage drive for caching policies that indicate the storage drive is operating according to a data preservation or according to a high-performance personality.

Once the current operating personality for the managed hardware component has been determined, at 320, the remote access controller determines a portion of the received firmware image to transmit to the managed hardware component. In some instances, it may be necessary for the remote access controller to immediately transmit the entire firmware image to the managed hardware component. However, in many instances, only a portion of the received firmware image can be transmitted to the managed hardware components and/or only a portion of the received firmware image need be immediately transmitted to the managed hardware component, while the remaining portion of the firmware image can be transmitted at a later time.

In some embodiments, the remote access controller compares the personality of the received firmware update against the current operating personality of the managed hardware component in order to determine the portion of the firmware image to transmit to the managed hardware component. For example, in scenarios where hardware component is operating according to different personality than the personality of the received firmware update, embodiments may defer transmission of all portions of the firmware image until a later time, such as when the hardware component is idle. For instance, if the managed hardware component is operating according to a high-security personality, a received firmware update that corresponds to a high-availability personality may be stored by the remote access controller and transmitted to the managed hardware component at a later time.

In some instances, only nonredundant portions of the received firmware update are transmitted to managed hardware components, whether immediately or after a period of deferral. A firmware image that is received by remote access controller may include instructions that adapt the personality of a managed hardware component, but may also include instructions that provided support for core functions of the hardware component, such as I/O, security and/or remote management functions that are core operations of the hardware component and that do not require any changes to support different personalities. Accordingly, at 320, the remote access controller also identifies the portions of a received firmware image that are redundant with firmware instructions that are already stored by the managed hardware component. In some embodiments, the remote access controller 405 may parse a firmware image to identify the different portions of the firmware update, where such parsing may utilize firmware boundary information and other metadata included in the firmware image. For instance, the firmware boundary information provided in the metadata may specific regions of the firmware image that correspond to different sets of firmware instructions included in the image, such as a region storing core I/O instructions and another region storing instructions for adapting the hardware component to a particular personality.

As described, the less time required to transmit a firmware image to a hardware component results in lower probabilities of encountering an error that may render the hardware component inoperable. Additionally, the more quickly the firmware of the hardware component can be updated, the more quickly the hardware component can initiate operations using the updated firmware. Accordingly, avoiding transmission of redundant firmware to the managed component reduces the interval during which an error may be encountered during transmission and reduces the delay in upgrading the operation of the managed component according to update the firmware. In providing support for avoiding transmission of redundant firmware and as illustrated in FIG. 4, the managed hardware component may include multiple slots 445a-n for the storage of firmware. In some embodiments, each of the firmware slots 445a-n may be regions in a local memory device of the managed hardware component 440. Some hardware components 440, such as an SSD or other storage drive, may include sufficient local storage space for any number of firmware slots, while many other hardware components may include sufficient storage only for a very limited number of firmware slots.

As illustrated in FIG. 4, the firmware slots of a managed hardware component 440 may store firmware for adapting the personality of the hardware component. For instance, firmware in slot 440b adapts the hardware component for high-availability operations and the firmware in slot 440c adapts the hardware component for high-performance operations. Additionally, firmware slots may be used to store firmware that implements core capabilities that are common to two or more of the personalities supported by managed hardware component 440. For instance, firmware slot 445a may be used to store firmware that implements core I/O capabilities of the managed hardware 440. In other instances, these core capabilities that are common to multiple supported personalities may additionally or alternatively include instructions that support security and remote management capabilities supported by managed hardware 440. Accordingly, upon receipt of a firmware image, the remote access controller determines whether portions of the received firmware image correspond to core instructions that are already stored in one of the firmware slots 445a-n of the managed hardware component 440.

In some embodiments, the remote access controller 405 may include a firmware image personality map 430 that tracks that firmware that has been stored in each of the firmware slots 445a-n of a managed hardware component 440, and further tracks personalities for the firmware in each of the slots. In the illustrated embodiment, the firmware image personality map 430 reflects the storage of core firmware in one of the firmware slots 445a and further reflects the storage of specific firmware personalities in firmware slots 445b-n. In this embodiment, the remote access controller uses the firmware image personality map 430 to determine whether the received firmware includes instructions that identical to instructions that are already stored in a core firmware slot 445a. If the received firmware includes instructions that are redundant with the core instructions stored in firmware slot 445a, that portion of firmware image is not transmitted to managed hardware component, thus reducing the interval during which firmware is being transmitted and also reduces the interval required to complete a firmware update.

For portions of the received firmware image that correspond to a firmware personalities, at 325, the remote access controller determines a firmware slot for storage of each firmware personality included in the received image. For instance, receipt of a firmware image that includes a high-security firmware personality results in the remote access controller utilizing the firmware personality map 430 in order to identify the firmware slot 445a that corresponds to a high-security personality for the managed hardware 440. At 330, the remote access controller transmits a portion of the received firmware image to the managed hardware 440. As described, some portions of the received firmware image may be transmitted immediately to the managed hardware 440, while transmittal of other portions of the received firmware may be deferred, such as received firmware that corresponds to a personality that is different from the current operating personality of managed hardware 440.

In some embodiments, transmittal of some portions of the received firmware image may be deferred until the managed hardware component 440 is idle. For example, in a scenario where the managed hardware 440 is a network controller, the remote access controller 405 may utilize sideband management capabilities to query operational metrics of the managed network controller, such as the number of bytes of data transmitted and/or received by the network controller over a certain interval, in order to identify an interval during which the network controller is idle. Based on such workflow monitoring, the remote access controller may identify windows of time during which the network controller can be expected to remain idle. In such embodiments, the remote access controller may defer transmittal of all or some portions of a receive firmware image until there is an idle interval by the managed hardware 440.

Regardless of whether any or all of a firmware image has been transmitted for local storage by the managed hardware, at 335, the remote access controller identifies proposed changes in a configuration of the IHS, such as to adapt the IHS for the different computational work. In some embodiments, the remote access controller monitors for configuration changes to managed hardware components for which one or more personality firmware slots have been populated according to the procedures described herein. In the above example of a network controller that may be reconfigured between an Ethernet personality and an InfiniBand personality through a firmware update, the remote access controller monitors for any user interface actions that include actual or proposed reconfiguration of the network controller between these two protocols. When the remote access controller detects any such reconfiguration of the network controller for InfiniBand operations, at 340, the remote access controller identifies a firmware personality that corresponds to this reconfiguration. In this example, an InfiniBand personality for a network controller that is a managed hardware component is determined the personality that corresponds to the detected reconfiguration of the network controller, such as by an administrator using a remote management interface, such as described with regard to FIG. 1, in order to reconfigure the network controller.

At 345, the remote access controller determines whether the local storage of the network controller includes firmware for operation according to the InfiniBand personality. As described with regard to FIG. 4, the remote access controller 405 may maintain a firmware image personality map 430 that tracks the firmware that is stored in each slot 445a-n of the local storage of the managed hardware component 440. Using such a map of tracked firmware, the remote access controller confirms that the local storage of the network controller includes a slot that stores firmware for operation according to the InfiniBand personality. As indicated in FIG. 3, the remote access controller issues a notification of the availability of locally stored firmware on the network controller, where the firmware supports the detected reconfiguration of the network controller, such as by an administrator utilizing a remote management interface. For example, the user interface in use by an administrator to reconfigure the network controller for InfiniBand operations may be configured in embodiments to present the administrator with a dialog box or other notification confirming the presence of firmware locally storage by the network controller that supports InfiniBand operations.

In another example, at 335, the remote access controller monitors for configuration changes to a storage controller for which multiple firmware personalities are available. In some embodiments, a storage controller may be reconfigured through firmware updates between operation as a RAID controller and operation as a host bus adapter (HBA). In an example where a storage controller is being reconfigured from an HBA to a RAID controller, at 340, the remote access controller identifies a firmware personality for the storage controller that corresponds to RAID operations. The remote access controller proceeds, at 345, to consult the firmware image tracking map to determine whether the storage controller includes a personality slot with locally stored firmware that corresponds to a RAID controller personality. If firmware for a RAID personality is identified, at 350, the administrator may be notified of the availability of firmware on the storage controller that supports RAID operations.

In another illustrative example, at 335, the remote access controller monitors for configuration changes to one or more SSDs (solid state drive) that may be installed in an IHS. In some embodiments, an SSD may be reconfigured through firmware updates between high-security, high-performance, high-availability, and data protection operations. In an example where an SSD is being reconfigured from data protection to high security operations through operations initiated at a remote management interface, at 340, the remote access controller identifies a firmware personality for the SSD that corresponds to high security operations. The remote access controller proceeds, at 345, to consult the firmware image tracking map to determine whether the SSD being updated includes a personality slot with locally stored firmware for a high security personality. If firmware for a high security personality is identified, at 350, the administrator is notified of the availability of locally stored firmware on the storage controller that supports high security operations. In some embodiments, the notification may include notifications of specific security protocols that are supported by firmware stored in a high-security personality slot, such as encryption and authentication requirements.

In some embodiments, switching to use of the identified firmware that supports the proposed reconfiguration by an administrator requires manual authorization by the administrator, where the request for confirmation may be included, at 350, within a notification of firmware availability on the managed hardware component. In some embodiments, authorization for switching to use of the identified firmware may be programmatically granted through operations supported by a remote management interface, such as described FIGS. 1 and 2. Whether authorization is granted manually or programmatically, at 355, the managed hardware component is notified of the change in personality and of the firmware slot of the managed hardware that includes the firmware for that personality.

As described with regard to FIG. 4, embodiments may store different types of firmware within the slots of a managed hardware component 440. In particular, firmware capabilities that are common to multiple different firmware personalities may be stored in separate slots for core firmware, such as 445a, that are distinct from slots for storage of the specialized firmware that implements each different personality being supported by the managed hardware 440. Accordingly, in some embodiments, a firmware image builder 435 of the remote access controller 405 tracks the available layering of firmware that is available within slots 445a-n. For instance, the firmware image builder 435 tracks the requirement for core firmware in slot 445a to be paired with firmware from exactly one of the personality slots 445b-n in order to construct a valid firmware image that can be loaded and used to operate the managed hardware component 440. In other instances, the firmware builder 435 tracks the requirement of firmware from multiple core slots to be combined with firmware from a personality slot in order to construct the image that is to be loaded by the hardware component.

At 360, the managed hardware component loads firmware from the one or more slots that are identified by the image builder 435 of the remote access controller. Upon loading the firmware from these slots, at 365, the managed hardware component operates according the updated personality for this component. In this manner, embodiments support rapid reconfiguration of a managed hardware component between different firmware personalities, while minimizing disruptions and resources requirements in loading the different firmware personalities by a managed component.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An IHS (Information Handling System) comprising:
one or more CPUs utilizing one or more buses that connect to a plurality of hardware components of the IHS;
a first of the hardware components that is adapted to operate according to a first personality through operation of a first firmware; and
a remote access controller supporting remote management of the Information Handling System (IHS), the remote access controller comprising a logic unit and a memory device having instructions stored thereon that, upon execution by the logic unit, cause the remote access controller to:
receive a first firmware image comprising the first firmware;
determine a personality of the first firmware;
store at least a portion of the first firmware to a first region of a persistent storage of the first hardware component, wherein the first region is designated as storing firmware for adapting the first hardware component to the first personality; and
in response to a detected reconfiguration of the IHS, generate a notification of the first firmware stored by the first hardware component and usable to adapt operation of the first hardware component to the first personality.

2. The IHS of claim 1, wherein the first hardware component may be adapted to operate according to a second personality through operation of a second firmware and wherein execution of the instructions further causes the remote access controller to:
receive a second firmware image comprising the second firmware;
determine a personality of the second firmware; and
store at least a portion of the second firmware to a second region of the persistent storage of the first hardware component, wherein the second region is designated as storing firmware for adapting the first hardware component to the second personality.

3. The IHS of claim 2, wherein execution of the instructions further causes the remote access controller to:
parse the first firmware image to identify a first portion of the first firmware image comprising instructions for adapting the first hardware component to the first personality and also to identify a second portion of the first firmware image comprising firmware instructions for core operations of the first hardware component, wherein the first portion of the first firmware image is stored to the first region of the persistent storage of the first hardware component that is designated as storing firmware for adapting the first hardware component to the first personality; and
store the second portion of the first firmware image to a third region of the persistent storage of the first hardware component, wherein the third region is designated as storing firmware instruction for core operations of the first hardware component.

4. The IHS of claim 3, wherein execution of the instructions further causes the remote access controller to:

parse the second firmware image to identify a portion of the second firmware image comprising instructions for operation of the first hardware component according to the second personality and also to identify a second portion of the second firmware image comprising firmware instructions for core operations of the first hardware component; and forgo storing the second portion of the second firmware image to the persistent storage of the first hardware component when the firmware instructions of the second firmware image for core operations of the first hardware component are identical to firmware instructions stored in the third region of the persistent storage of the first hardware component.

5. The IHS of claim 3, wherein the firmware instructions for core operations of the first hardware component comprise firmware instructions implementing I/O capabilities of the first hardware component.

6. The IHS of claim 3, wherein the firmware instructions for core operations of the first hardware component comprise firmware instructions implementing security operations by the first hardware component.

7. The IHS of claim 1, wherein execution of the instructions further causes the remote access controller to:

detect a manual configuration of the IHS by an administrator, and where the configuration modifies operations by the first hardware component, and wherein the generated notification of the first firmware stored by the first hardware component comprises a notification provided to the administrator that is manually configuring the IHS.

8. The IHS of claim 7, wherein the first hardware component comprise a network controller, and wherein the manual configuration of the IHS by the administrator comprises a configuration of a communication protocol used by the network controller, and wherein the notification provided to the administrator comprises a user interface notification informing the administrator of locally stored firmware by the network controller that supports operation according to the configured communication protocol.

9. The IHS of claim 7, wherein the first hardware component comprise an SSD, and wherein the manual configuration of the IHS by the administrator comprises a configuration of security protocols employed by the SSD, and wherein the notification provided to the administrator comprises a user interface notification informing the administrator of locally stored firmware by the SSD that supports the configured security protocols.

10. The IHS of claim 3, wherein execution of the instructions further causes the remote access controller to:

maintain a mapping of firmware stored in the first region, second region and third region of the persistent storage of the first hardware component, wherein the mapping is used to generate the notification the first firmware stored by the first hardware component.

11. A method for personality based updates to firmware utilized by a hardware component of an IHS (Information Handling System), wherein the firmware updates are managed by a remote access controller of the IHS that provides remote management of the hardware component, the method comprising:

receiving, by the remote access controller, a first firmware image comprising first firmware that adapts the hardware component for operation according to a first personality;

storing, by the remote access controller, at least a portion of the first firmware to a first region of a persistent storage of the hardware component, wherein the first region is designated as storing firmware for adapting the first hardware component to the first personality;

receiving, by the remote access controller, a second firmware image comprising second firmware that adapts the hardware component for operation according to a second personality;

storing, by the remote access controller, at least a portion of the second firmware to a second region of the persistent storage of the hardware component, wherein the second region is designated as storing firmware for adapting the hardware component to the second personality; and in response to a detected reconfiguration of the IHS, generate a notification of the first firmware that is stored by the first hardware component and usable to adapt operation of the first hardware component to the first personality and generate a notification of the second firmware that is stored by the hardware component and usable to adapt operation of the hardware component to the second personality.

12. The method of claim 11, further comprising:

parsing the first firmware image to identify a first portion of the first firmware image comprising instructions for operation of the hardware component according to the first personality and also to identify a second portion of the first firmware image comprising firmware instructions for core operations of the hardware component, wherein the first portion of the first firmware image is stored to the first region of the persistent storage of the hardware component that is designated as storing firmware for adapting the hardware component to the first personality; and storing the second portion of the first firmware image to a third region of the persistent storage of the hardware component, wherein the third region is designated as storing firmware instruction for core operations of the hardware component.

13. The method of claim 12, further comprising:

parsing the second firmware image to identify a portion of the second firmware image comprising instructions for operation of the hardware component according to the second personality and also to identify a second portion of the second firmware image comprising firmware instructions for core operations of the hardware component; and forgoing storage of the second portion of the second firmware image to the persistent storage of the hardware component when the firmware instructions in the second firmware image for core operations of the hardware component are identical to firmware instructions stored in the third region of the persistent storage of the hardware component.

14. The method of claim 12, wherein the firmware instructions for core operations of the hardware component comprise firmware instructions implementing I/O capabilities of the hardware component.

15. The method of claim 11, further comprising:

detecting a manual configuration of the IHS by an administrator using a remote management interface, and where the configuration modifies operations by the hardware component, and wherein the generated notifications of firmware stored by the hardware component comprise notification that are provided to the administrator that is manually configuring the IHS.

16. A system comprising:
a hardware component of an Information Handling System (IHS), wherein the hardware component comprises a persistent storage, and wherein the hardware component may be adapted to operate according to a first personality through operation of a first firmware; and
a remote access controller supporting remote management of the hardware component of the IHS, the remote access controller comprising a logic unit and a memory device having instructions stored thereon that, upon execution by the logic unit, cause the remote access controller to:
  receive a first firmware image comprising the first firmware;
  determine a personality of the first firmware;
  store at least a portion of the first firmware to a first region of the persistent storage of the first hardware component, wherein the first region is designated as storing firmware for adapting the hardware component to the first personality; and
  in response to a detected reconfiguration of the IHS, generate a notification of the first firmware that is stored by the hardware component and usable to adapt operation of the hardware component to the first personality.

17. The system of claim 16, wherein the hardware component may be adapted to operation according to a second personality through operation of a second firmware and wherein execution of the instructions further causes the remote access controller to:
  receive a second firmware image comprising the second firmware;
  determine a personality of the second firmware; and
  store at least a portion of the second firmware to a second region of the persistent storage of the hardware component, wherein the second region is designated as storing firmware for adapting the hardware component to the second personality.

18. The system of claim 17, wherein execution of the instructions further causes the remote access controller to:
  parse the first firmware image to identify a first portion of the first firmware image comprising instructions for operation of the hardware component according to the first personality and also to identify a second portion of the first firmware image comprising firmware instructions for core operations of the hardware component, wherein the first portion of the first firmware image is stored to the first region of the persistent storage of the hardware component that is designated as storing firmware for adapting the hardware component to the first personality; and
  store the second portion of the first firmware image to a third region of the persistent storage of the hardware component, wherein the third region is designated as storing firmware instruction for core operations of the hardware component.

19. The system of claim 18, wherein execution of the instructions further causes the remote access controller to:
  parse the second firmware image to identify a portion of the second firmware image comprising instructions for operation of the hardware component according to the second personality and also to identify a second portion of the second firmware image comprising firmware instructions for core operations of the hardware component; and
  forgo storing the second portion of the second firmware image to the persistent storage of the hardware component when the firmware instructions of the second firmware image for core operations of the hardware component are identical to firmware instructions stored in the third region of the persistent storage of the hardware component.

20. The system of claim 16, wherein the firmware instructions for core operations of the hardware component comprise firmware instructions implementing I/O capabilities of the hardware component.

* * * * *